United States Patent
Yamamoto et al.

(10) Patent No.: US 7,252,760 B2
(45) Date of Patent: Aug. 7, 2007

(54) WASTE LIQUID PROCESSING METHOD AND WASTE LIQUID PROCESSING APPARATUS USING THE SAME

(75) Inventors: Jun Yamamoto, Hamamatsu (JP); Akira Osawa, Hamamatsu (JP); Yoichi Nagasaki, Hamamatsu (JP); Kunimasa Muroi, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 401 days.

(21) Appl. No.: 10/274,955

(22) Filed: Oct. 22, 2002

(65) Prior Publication Data
US 2003/0080064 A1    May 1, 2003

(30) Foreign Application Priority Data
Oct. 25, 2001    (JP)    ............... P2001-328365

(51) Int. Cl.
*B01D 57/00*    (2006.01)
(52) U.S. Cl. .................. 210/142; 210/182; 210/202
(58) Field of Classification Search ............. 210/142, 210/143, 180, 181, 182, 188, 202, 257.1, 210/259, 266
See application file for complete search history.

(56) References Cited

U.S. PATENT DOCUMENTS 4,422,923 A  * 12/1983  Wirtz et al. ............... 208/33
4,581,133 A  *  4/1986  Tomes ....................... 210/90

FOREIGN PATENT DOCUMENTS

| JP | 2-107314  | 4/1990 |
| JP | 5-15749   | 1/1993 |
| JP | 9-155160  | 6/1997 |
| JP | 10-128063 | 5/1998 |

* cited by examiner

Primary Examiner—Ivars C. Cintins
(74) Attorney, Agent, or Firm—Dickstein, Shapiro, LLP.

(57) ABSTRACT

A waste liquid processing method comprising a solvent separation process for separating a chlorine-based organic solvent contained in a waste liquid; a first vaporization process that includes vaporization of the chlorine-based organic solvent remaining in the waste liquid after the solvent separation process; a collection process for collecting substances other than the chlorine-based organic solvent contained in the waste liquid after being vaporized in the first vaporization process; a second vaporization process for vaporizing the chlorine-based organic solvent remaining in the waste liquid after the first vaporization process and the collection process; a photo-oxidative decomposition process where photo-oxidation is used to decompose a chlorine-based organic gas generated in the first vaporization process and in the second vaporization process, and a post-treatment process for carrying out adsorption, absorption, and neutralization of a decomposition product gas generated in the photo-oxidative decomposition process.

6 Claims, 4 Drawing Sheets

WASTE LIQUID PROCESSING METHOD AND WASTE LIQUID PROCESSING APPARATUS USING THE SAME

BACKGROUND OF THE INVENTION

1. Field of the Invention

The present invention relates to a waste liquid processing method and a waste liquid processing apparatus used in the method, for the purpose of selectively separating, decomposing by means of a photocatalyst, and thereby defusing a chlorine-based organic solvent contained in exhaust gas or waste liquid discharged from a process that uses the chlorine-based organic solvent such as trichloroethylene used in a cleaning apparatus for metal parts and tetrachloroethylene used in a dry cleaning apparatus.

2. Description of the Related Art

A chlorine-based organic solvent has been widely used as an excellent cleaning agent for its excellent cleaning performance, stability, and non-flammability.

Recently, since chlorine-based organic solvents were designated as priority procurement substance and voluntarily controlled substances by the Air Pollution Control Law because they are toxic materials that pollute the atmosphere, treatment methods such as adsorption onto active carbon and evaporation by heating have been employed to keep the concentration of the chlorine-based organic solvent contained in waste liquid and exhaust gas discharged from cleaning apparatuses, such as a dry cleaning apparatus, within permissible emission values (0.1 mg per liter for tetrachloroethylene) as specified in the Water Pollution Control Law.

Figure 5:
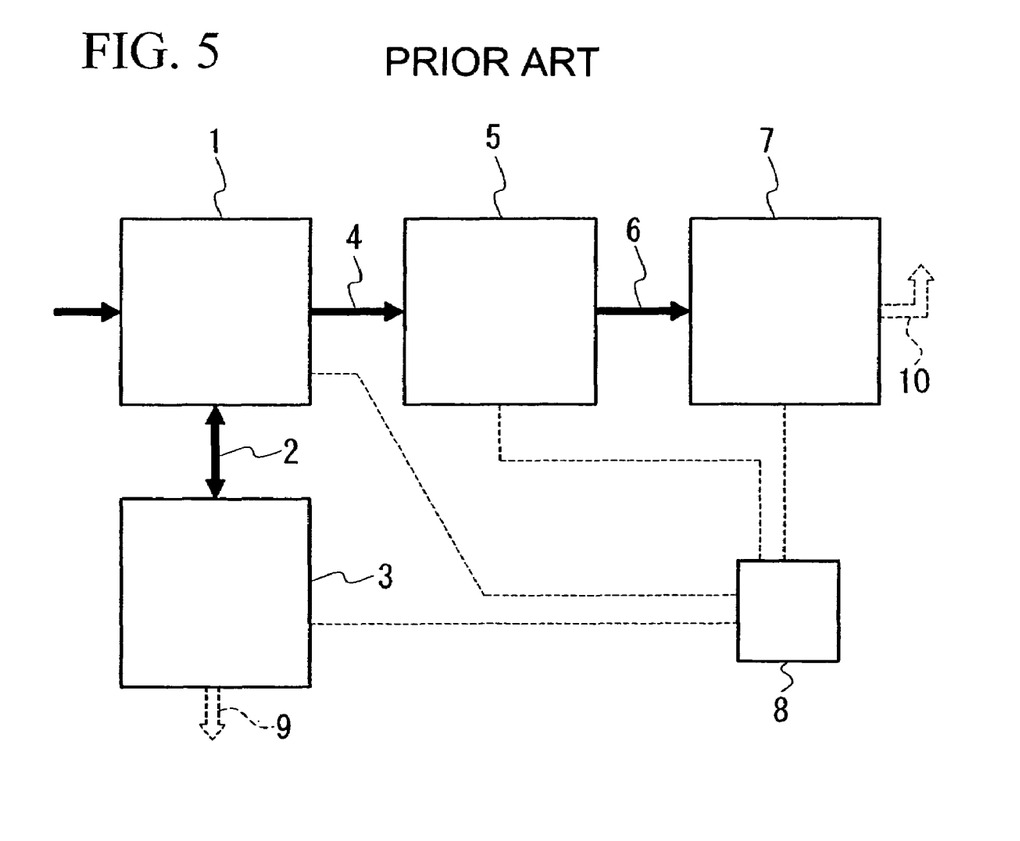
FIG. 5 is a schematic plan view of the waste liquid processing apparatus of the prior art.

FIG. 5 schematically shows an example of a prior art waste liquid processing apparatus.

In FIG. 5, reference numeral 1 denotes a solvent separation process section, and the arrows indicate the direction in which the chlorine-based organic solvent flows. The solvent separation process section 1 is connected to a vaporization process section 3 either directly or via a waste liquid supply line 2. Further connected to the vaporization process section 3 is a discharge line 9 that discharges effluent after aeration.

The solvent separation process section 1 is also connected, via a vaporization gas supply line 4, to a photo-oxidative decomposition process section 5, and the photo-oxidative decomposition process section 5 is connected to a post-treatment process section 7 via a decomposition product gas supply line 6. Further connected to the post-treatment process section 7 is a discharge line 10 that discharges non-toxic air containing post-treated water and carbon dioxide.

The waste liquid processing apparatus further comprises a control section 8 that controls the solvent separation process section 1, the vaporization process section 3, the photo-oxidative decomposition process section 5, and the post-treatment process section 7.

The solvent separation process section 1 selectively adsorbs the chlorine-based organic solvent that is dispersed in the form of minute particles in the waste liquid. Then the waste liquid containing the chlorine-based organic solvent that has not been adsorbed in the solvent separation process section 1 is aerated in the vaporization process section 3 so as to vaporize the chlorine-based organic solvent, and the vaporization gas containing the chlorine-based organic gas thus generated is passed through the solvent separation process section 1 again. When passing through the solvent separation process section 1, the vaporization gas vaporizes the chlorine-based organic solvent that has been adsorbed in the solvent separation process section 1, and the total combined vaporization gas is introduced into the photo-oxidative decomposition process section 5 through the combined vaporization gas supply line 4. Then the vaporization gas is decomposed in the photo-oxidative decomposition process section 5, and the decomposition product gas containing the chlorine-based gas generated by the photo-oxidative decomposition reaction is introduced into the post-treatment process section 7 through the decomposition product gas supply line 6, so as to be adsorbed, absorbed, and/or neutralized in the post-treatment process section 7 to be converted into non-toxic chlorides, thereby completing the treatment of waste water or exhaust gas.

The waste liquid discharged from a dry cleaning apparatus may include, in addition to the chlorine-based organic solvent, substances such as isopropyl alcohol, ethylene glycol, and surfactant. There has been a problem such that, when such substances are vaporized together with the chlorine-based organic solvent in the vaporization process section 3 and are introduced into the photo-oxidative decomposition process section 5 via the vaporization gas supply line 4, the capability of the photo-oxidative decomposition process section 5 to decompose the chlorine-based organic gas decreases, thus causing the chlorine-based organic gas to be released into the atmosphere without being decomposed. There is also a problem such that, as the capability of the photo-oxidative decomposition process section 5 to decompose the chlorine-based organic gas decreases, the efficiency of the treatment also decreases.

BRIEF SUMMARY OF THE INVENTION

The present invention has been devised to solve the problems described above, and has an object to provide a waste liquid processing method having a high treatment efficiency that maintains the capability to decompose the chlorine-based organic gas, and a waste liquid processing apparatus that employs the method.

The object described above can be achieved by a waste liquid processing method that comprises a solvent separation process where the chlorine-based organic solvent contained in a waste liquid is separated, a first vaporization process that includes vaporization of the chlorine-based organic solvent remaining in the waste liquid after the solvent separation process, a collection process for collecting substances other than the chlorine-based organic solvent contained in the waste liquid after being vaporized in the first vaporization process, a second vaporization process for vaporizing the chlorine-based organic solvent remaining in the waste liquid after the first vaporization process and the collection process, a photo-oxidative decomposition process where photo-oxidation is used to decompose the chlorine-based organic gas generated in the first vaporization process and in the second vaporization process, and a post-treatment process of adsorption, absorption, and neutralization of decomposition product gas generated in the photo-oxidative decomposition process.

The second vaporization process is preferably provided in a stage following the first vaporization process and the collection process, and prior to the photo-oxidative decomposition process.

The solvent separation process is preferably a process in which the waste liquid is brought into contact with a separation member made of a porous material that has water repellency and/or lipophilicity so as to adsorb the chlorine-based organic solvent contained in the waste liquid.

The first vaporization process and the second vaporization process are preferably carried out by aeration.

The first vaporization process preferably includes a separation member vaporization process where the chlorine-based organic solvent adsorbed onto the separation member made of the porous material is vaporized.

The vaporization process in the first vaporization process is preferably carried out using air containing the chlorine-based organic gas generated in the second vaporization process.

The vaporization process is preferably always carried out using fresh air in the second vaporization process.

The object described above can be achieved by means of a waste liquid processing apparatus comprising a solvent separation process section where the chlorine-based organic solvent contained in a waste liquid is separated, a first vaporization process section having functions that include vaporization of the chlorine-based organic solvent remaining in the waste liquid after a solvent separation process, a collection process section for collecting substances other than the chlorine-based organic solvent contained in the waste liquid after being vaporized in a first vaporization process, a second vaporization process section for vaporizing the chlorine-based organic solvent remaining in the waste liquid after the first vaporization process and a collection process, a photo-oxidative decomposition process section where photo-oxidation is used to decompose the chlorine-based organic gas generated in the first vaporization process and subjected to the collection process and the chlorine-based organic gas generated in a second vaporization process, a post-treatment process section for carrying out adsorption, absorption, and neutralization of a decomposition product gas generated in a photo-oxidative decomposition process, and a control section comprising a sequencer that controls the operations of these sections.

The post-treatment section preferably includes a processing agent and is connected to a processing agent supply section that controls the concentration of the processing agent so as to be constant.

The second vaporization process section and the post-treatment section are preferably connected to a treated liquid discharge section.

DETAILED DESCRIPTION OF THE INVENTION

The present invention will now be described in detail below.

Figure 1:
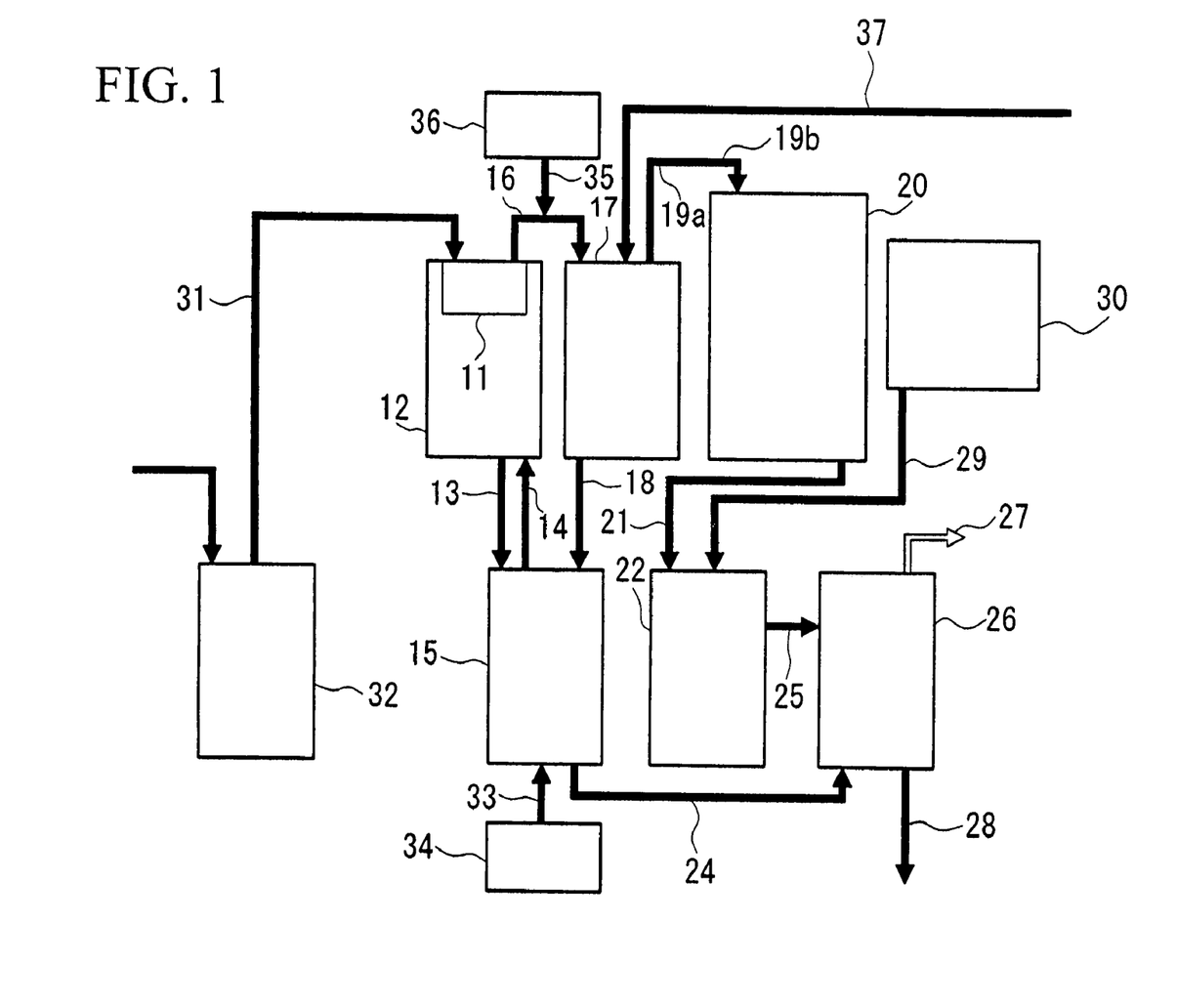
FIG. 1 schematically shows an example of the waste liquid processing apparatus of the present invention.

FIG. 1 schematically shows an example of the waste liquid processing apparatus of the present invention.

In FIG. 1, reference numeral 11 denotes a solvent separation process section, and the arrows indicate the direction in which the chlorine-based organic solvent flows. The solvent separation process section 11 is connected directly to a first vaporization process section 12. The first vaporization process section 12 is connected to a second vaporization process section 15 via a first waste liquid supply line 13 and a first vaporization gas supply line 14. The solvent separation process section 11 is also connected, via a second vaporization gas supply line 16, to a collection process section 17. The collection process section 17 is connected to the second vaporization process section 15 via a second waste liquid supply line 18. The collection process section 17 is also connected to a photo-oxidative decomposition process section 20 via third vaporization gas supply lines 19a, 19b. The photo-oxidative decomposition process section 20 is connected to a post-treatment process section 22 via a decomposition product gas supply line 21.

Further, the second vaporization process section 15 is connected to a treated liquid discharge section 26 via a third waste liquid supply line 24. The post-treatment process section 22 is connected to the treated liquid discharge section 26 via an exhaust line 25 that discharges non-toxic air containing carbon dioxide. Connected to the treated liquid discharge section 26 is an exhaust line 27 that discharges non-toxic air into the atmosphere and a discharge line 28 that discharges non-toxic effluent. Connected to the post-treatment section 22 is a processing agent supply section 30 via a processing agent supply line 29. The solvent separation process section 11 is connected via a waste liquid supply line 31 to a waste liquid supply section 32. Also connected to the second vaporization process section 15 via a first compressed air supply line 33 is a first compressed air supply section 34. The collection process section 17 is connected via a second compressed air supply line 35 and the second vaporization gas supply line 16 to a second compressed air supply section 36. Connected to the collection process section 17 is a tap water supply line 37 for supplying tap water into the collection process section.

The waste liquid processing apparatus in this example further has a control section (not shown) that comprises a sequencer for controlling the operations of the sections described above.

The solvent separation process section 11 may be installed separately from the first vaporization process section 12, but is installed in the path of a first stage in the first vaporization process section 12 in this case.

Waste liquid discharged from a cleaning apparatus, such as a dry cleaning apparatus, is pumped by a waste liquid supply pump (not shown) or the like installed in the waste liquid supply section 32, so as to flow into the solvent separation process section 11 via the waste liquid supply line 31. In the solvent separation process section 11, the chlorine-based organic solvent that is dispersed in the form of minute particles in the waste liquid is selectively adsorbed.

Then the waste liquid containing the chlorine-based organic solvent that has not been adsorbed in the solvent separation process section 11 is aerated in the first vaporization process section 12 so as to vaporize the chlorine-based organic solvent. The waste liquid containing the chlorine-based organic solvent that has not been vaporized in the first vaporization process section 12 is supplied to the second vaporization process section 15 via the first waste liquid supply line 13, and then is aerated in the second vaporization process section 15 so as to vaporize the chlorine-based organic solvent. Additional waste liquid is supplied to the first vaporization process section 12 from the waste liquid supply section 32 through supply line 31 and then through the solvent separation process section 11.

Vaporization processes in the first vaporization process section 12 and the second vaporization process section 15 are carried out using fresh air that is constantly supplied from the first compressed air supply section 34. Specifically, the chlorine-based organic solvent contained in the waste liquid contained in the second vaporization process section 15 is first vaporized by means of fresh air that is constantly supplied from the first compressed air supply section 34 via the first compressed air supply line 33 to the second vaporization process section 15. Then the air containing chlorine-based organic gas generated by vaporization is supplied via the first vaporization gas supply line 14 to the first vaporization process section 12, so that the chlorine-based organic solvent and substances such as isopropyl alcohol, ethylene glycol, and surfactant contained in the waste liquid that is contained in the first vaporization process section 12 is vaporized by the air containing chlorine-based organic gas. The vaporization gas containing the chlorine-based organic solvent and substances such as isopropyl alcohol, ethylene glycol, and surfactant that have been vaporized is passed through the solvent separation process section 11 again. When passing through the solvent separation process section 11, the vaporization gas vaporizes the chlorine-based organic solvent and substances such as isopropyl alcohol, ethylene glycol, and surfactant that have been adsorbed in the solvent separation process section 11, and the total combined vaporization gas is introduced into the collection process section 17 through the second vaporization gas supply line 16.

Then the vaporization gas of the chlorine-based organic solvent and substances such as isopropyl alcohol, ethylene glycol, and surfactant is passed through tap water in the collection process section 17, so that water-soluble substances such as isopropyl alcohol, ethylene glycol, and surfactant are dissolved in the tap water. Thus, substances such as isopropyl alcohol, ethylene glycol, and surfactant are collected in the tap water and will not be passed on to the photo-oxidative decomposition process section 20 that follows the collection process section 17.

Tap water is supplied to the collection process section 17 through the tap water supply line 37. The supply (replacement) of tap water to the collection process section 17 is carried out after a predetermined amount of substances such as isopropyl alcohol, ethylene glycol, and surfactant has been collected, or at predetermined time intervals.

Then a water solution containing substances such as isopropyl alcohol, ethylene glycol, and surfactant that have been collected in the collection process section 17 and the chlorine-based organic solvent that has been captured by the tap water is supplied to the second vaporization process section 15 via the second waste liquid supply line 18.

Then in the second vaporization process section 15, the chlorine-based organic solvent contained in the waste liquid contained in the second vaporization process section 15 is vaporized by fresh air, and the air containing the chlorine-based organic gas is supplied through the first vaporization gas supply line 14 to the first vaporization process section 12, then aerates the waste liquid in the first vaporization process section 12 and vaporize the solvent and chlorine-based organic gas absorbed in the solvent separation process section 11. The vaporization gas generated from the first vaporization process section 12 and the solvent separation process section 11 is supplied to the collection process section 17 via the second vaporization gas supply line 16.

The waste liquid containing substances such as isopropyl alcohol, ethylene glycol, and surfactant contained in the second vaporization process section 15 is introduced into the treated liquid discharge section 26 via the third waste liquid supply line 24.

The vaporization gas which was subjected to elimination of substances other than the chlorine-based organic gas in the collection process section 17 is supplied to the photo-oxidative decomposition process section 20 via the third vaporization gas supply lines 19a and 19b, and the chlorine-based organic gas is decomposed by photo-oxidation in the photo-oxidative decomposition process section 20.

The decomposition product gas containing a chlorine-based gas and the like generated by a photo-oxidative decomposition reaction in the photo-oxidative decomposition process section 20 is introduced through the decomposition product gas supply line 21 into the post-treatment process section 22 so as to be adsorbed, absorbed, and neutralized in the post-treatment process section 22 thereby being converted into non-toxic chlorides.

The post-treatment process section 22 is supplied, from the processing agent supply section 30 via the processing agent supply line 29, with a processing agent comprising a predetermined quantity of alkali ionic water or the like for adsorbing, absorbing, and neutralizing the decomposition product gas containing the chlorine-based gas supplied from the photo-oxidative decomposition process section 20.

Then in the treated liquid discharge section 26, waste liquid containing substances such as isopropyl alcohol, ethylene glycol, and surfactant introduced from the second vaporization process section 15 via the third waste liquid supply line 24 is aerated by non-toxic gas not containing chlorine-based organic gas introduced from the post-treatment process section 22 through the discharge line 25. Non-toxic gas is exhausted through the exhaust line 27, and the effluent is discharged through the discharge line 28.

The term waste liquid refers to a solution to be treated that is charged into the waste liquid processing apparatus of the present invention so as to be rendered non-toxic. Effluent refers to a treated solution that has been treated in the waste liquid processing apparatus to become non-toxic and is then discharged out of the apparatus.

Now an example of the waste liquid processing apparatus according to the present invention will be described below with reference to FIG. 2 through FIG. 4.

Figure 2:
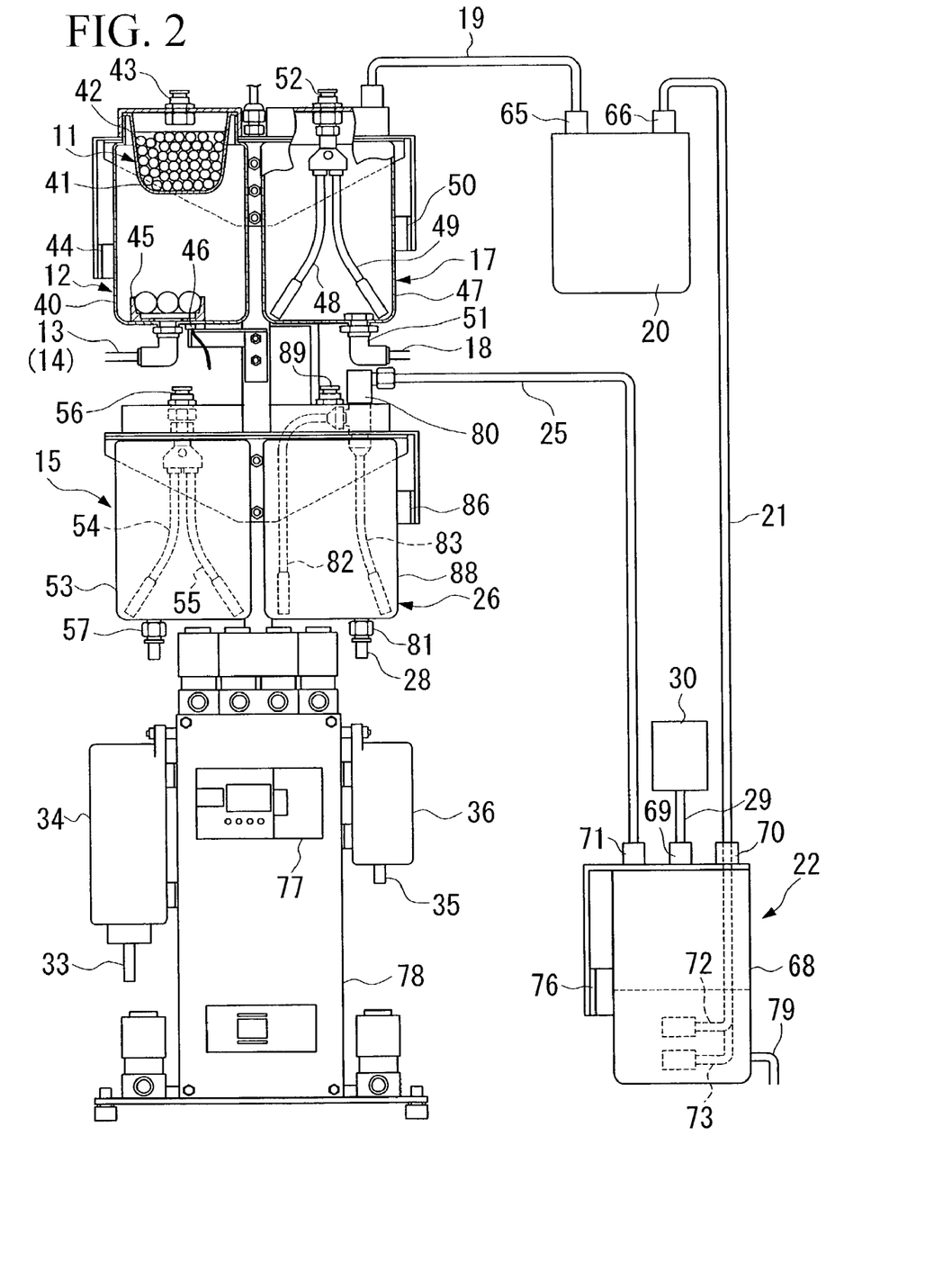
FIG. 2 is a schematic front view of an example of the waste liquid processing apparatus of the present invention with a part shown in cutaway view.

FIG. 2 is a schematic front view of the waste liquid processing apparatus of the present invention with a part shown in cutaway view. FIG. 3 is a schematic side view of the waste liquid processing apparatus of the present invention with a part shown in cutaway view and a part of the cutaway view shown in sectional view. FIG. 4 is a schematic plan view of the waste liquid processing apparatus of the present invention with a part shown in cutaway view.

Figure 3:
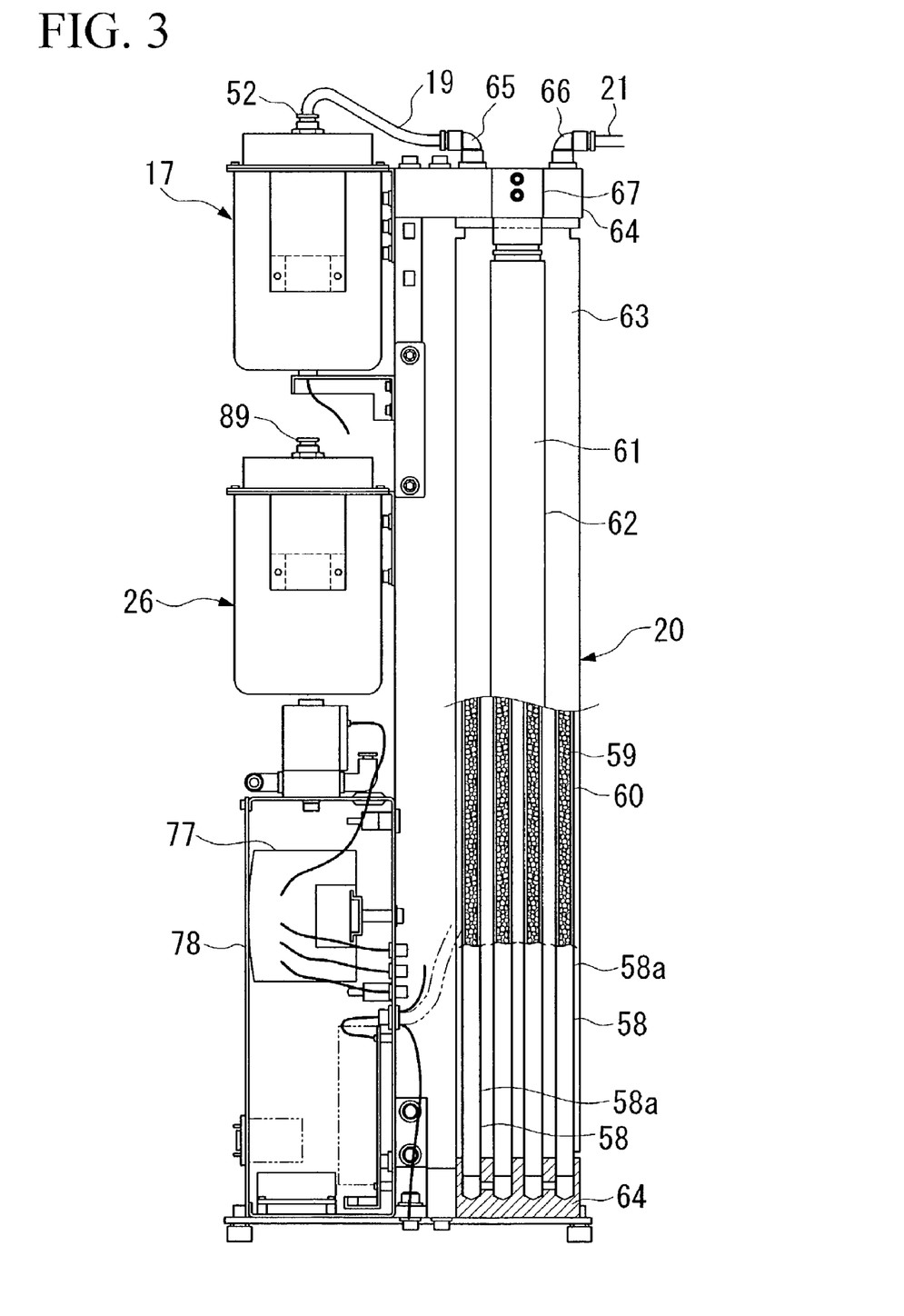
FIG. 3 is a schematic side view of an example of the waste liquid processing apparatus of the present invention with a part shown in cutaway view and a part of the cutaway view shown in sectional view.
Figure 4:
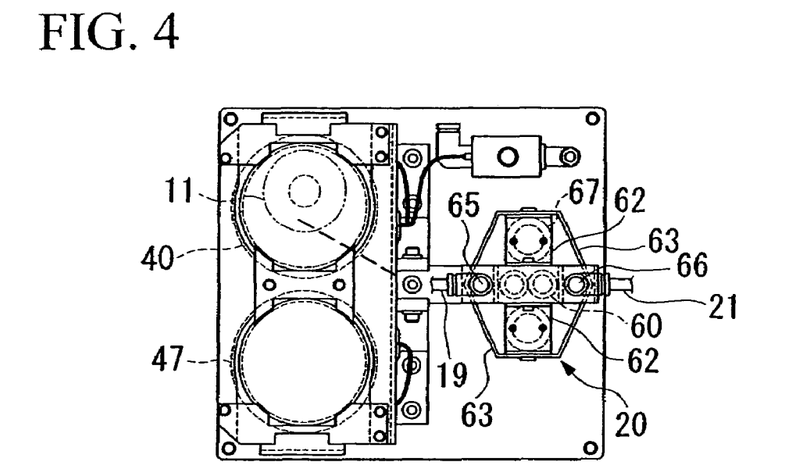
FIG. 4 is a schematic plan view of an example of the waste liquid processing apparatus of the present invention with a part shown in cutaway view.

In FIG. 2 through FIG. 4, the solvent separation process section 11 accommodates a separation member 42 made of a porous material.

As shown in FIG. 2, the solvent separation process section 11 has a constitution such that a separation tank 41 installed in an upper portion in an aeration tank 40 is filled with the separation member 42 made of a granular porous material.

The separation tank 41 has a cylindrical shape having a diameter from around 3 to 15 cm and a height from around 3 to 10 cm, with the outer diameter being substantially equal to the inner diameter of the aeration tank 40 at the upper portion thereof. The top and bottom of the separation tank form a meshlike container. A material such as fluorine resin, vinyl chloride resin, polyethylene resin, or another polymeric substance, or stainless steel that has high corrosion resistance, high chemical resistance, and high water repellency is used, or it is a tank made of stainless steel lined with such a material on the inner surface.

The separation member 42 that fills the separation tank 41 may be a porous material made of active carbon, zeolite, or a sintered body of a water-repellent and/or lipophilic resin that can selectively adsorb the chlorine-based organic solvent and substances such as isopropyl alcohol, ethylene glycol, and surfactant contained in the waste liquid. Among these, a porous material which is a sintered body of a water-repellent and/or lipophilic resin is preferably used.

The separation member 42 has continuous pores of a diameter in a range from 10 to 300 μm, preferably from 20 to 100 μm, and a void ratio in a range from 5 to 50%, preferably from 10 to 30%.

The shape of the separation member 42 may be a ball, cylinder, barrel, or rod with a volume from 1 to 1,000 mm$^3$.

The separation member 42 is capable of adsorbing the chlorine-based organic solvent in a quantity that corresponds to its own weight. Thus, the quantity of the porous material may be determined in accordance with the quantity of the chlorine-based organic solvent and substances such as isopropyl alcohol, ethylene glycol, and surfactant to be processed in one cycle of the treatment operation.

Waste liquid to be treated in the waste liquid processing apparatus of the present invention is supplied to the solvent separation process section 11 through an inlet located at the center on top of the aeration tank 40. As the waste liquid passes through the separation member 42, the chlorine-based organic solvent and substances such as isopropyl alcohol, ethylene glycol, and surfactant contained in the waste liquid in the form of minute particles are selectively adsorbed.

The solvent separation process section 11 is not limited to the constitution described above wherein the separation tank 41 is filled with the granular separation member 42, and may also be constituted by only the separation member 42 having the form of a membrane, plate, or grating.

The dimensions of the separation member 42 having the form of a membrane, plate, or grating may be determined in accordance with the dimensions of the aeration tank 40, with a thickness in a range from 0.5 to 10 mm, and preferably from 1 to 3 mm.

The water repellent and/or lipophilic resin used for the separation member 42 may be a polyolefin resin, fluorine resin, silicone resin, or the like. As the polyolefin resin, polyethylene (hereinafter abbreviated as PE), polypropylene (hereinafter abbreviated as PP), ultra high molecular weight polyethylene (hereinafter abbreviated as UHPE), or the like may be used. As the fluorine resin, polytetrafluoroethylene (hereinafter abbreviated as PTFE) or the like may be used. The water repellent and/or lipophilic resin used in the present invention is preferably UHPE that has a mean molecular weight in a range from 100,000 to 5 million.

An aeration process section is used in the first vaporization process section 12. The aeration process section comprises a waste liquid inlet 43 located at the top of the aeration tank 40 for charging waste liquid, a vaporization gas outlet (not shown) for discharging gas after aeration, the first waste liquid supply line 13 for discharging waste liquid that has been subjected to the aeration process into the second vaporization process section 15 located at the bottom of the aeration tank 40, and the first vaporization gas supply line 14 for sending compressed air supplied from the second vaporization process section 15 and the chlorine-based organic gas that has vaporized in the second vaporization process section 15.

The aeration tank 40 is a pressure tank of a substantially cylindrical shape having a diameter from around 3 to 15 cm and a height from around 10 to 30 cm, and is made of a material such as a fluorine resin, vinyl chloride resin, polyethylene resin, or another polymeric substance that has high corrosion resistance, high chemical resistance, and high water repellency, or is a tank lined with such a material as described above on the inner surface.

Provided in the aeration tank 40 is a stirrer of a jet flow type, propeller type, or the like (not shown in the drawing) for improving the effect of aeration.

The liquid level in the aeration tank 40 can be monitored by means of a liquid level sensor 44 installed on the outer surface in a middle portion of the aeration tank 40, so as to maintain the liquid level in the aeration tank 40 to be constant.

The waste liquid inlet 43 is connected via a waste liquid supply line (not shown) to a waste liquid supply section (not shown) that is provided separately.

The waste liquid tank of the waste liquid supply section is a tank having a capacity of 20 liters or less and is made of a material such as a fluorine resin, polyethylene resin, or another polymeric substance that has high corrosion resistance, high chemical resistance, and high water repellency, or stainless steel, or the tank may be made of stainless steel lined with such a material on the inner surface. Connected to the waste liquid tank is a discharge line coming from a water separator of a cleaning apparatus such as a dry cleaning apparatus either directly or via a filter that collects foreign matter. The waste liquid tank is also provided with a liquid level sensor that monitors the liquid level.

A waste liquid supply pump is installed either in the waste liquid tank or the outside thereof, so as to supply waste liquid from the waste liquid tank via the waste liquid supply line and the waste liquid inlet 43 to the solvent separation process section 11 upon receipt of a signal from the control section. Installed at the outlet of the waste liquid supply pump is a check valve that prevents aeration gas from flowing back into the waste liquid tank due to the air pressure increased during the aeration process. A solenoid valve may be used instead of the check valve. A bath water pump for home use may be used for the waste liquid supply pump.

The first waste liquid supply line 13 also serves as the first vaporization gas supply line 14 that functions as an intermediate tube which serves as both a waste liquid tube and a compressed air introduction tube.

Connected to the first vaporization gas supply line 14 is an aeration section 45 comprising an aeration tube or an air diffusion plate installed at the bottom in the aeration tank 40, in order to improve the efficiency of aeration. Moreover, an air flow sensor 46 that monitors the flow rate of air supplied for aeration is connected to a portion of the bottom surface of the aeration tank 40 where the first waste liquid supply line 13 is connected.

A solenoid valve (not shown) is connected to the intermediate tube that serves as both the first waste liquid supply line 13 and the first vaporization gas supply line 14, so as to switch between the exhaust of waste liquid from the aeration tank 40 and the supply of compressed air from the aeration tank 53.

The vaporization gas outlet is connected via a second vaporization gas supply line (not shown) to the collection process section 17, so that vaporization gas generated in the aeration process is transferred into the collection process section 17. The second vaporization gas supply line is made of a polymeric substance that has high corrosion resistance such as a fluorine resin, polyethylene resin, or nylon resin.

The first vaporization process section 12 is designed so that, when the vaporization gas that has been subjected to the aeration process passes through the separation member 42, the chlorine-based organic solvent and substances such as isopropyl alcohol, ethylene glycol, and surfactant that have been adsorbed onto the separation member 42 are vaporized and air containing these substances is supplied to the collection process section 17.

The collection process section 17 has a constitution such that vaporization gas supply lines 48, 49 are installed in a collection tank 47.

The dimensions of the collection tank 47, that is made of a material similar to that of the aeration tank 40, are about 3 to 15 cm in diameter and 3 to 10 cm in height.

The collection tank 47 is filled with tap water for collecting water-soluble substances such as isopropyl alcohol, ethylene glycol, and surfactant by dissolving in water.

Tap water is supplied to the collection tank 47 through a tap water supply line (not shown). The liquid level in the collection tank 47 can be monitored with a liquid level sensor 50 installed on the outer surface of the collection tank 47 in a middle portion thereof, so as to maintain the liquid level in the collection tank 47 at a volume necessary for one cycle of the process to collect substances such as isopropyl alcohol, ethylene glycol, and surfactant.

The supply (replacement) of tap water to the collection tank 47 is carried out after a predetermined amount of substances such as isopropyl alcohol, ethylene glycol, and surfactant has been collected, or at a predetermined time interval. At this time, waste liquid containing substances such as isopropyl alcohol, ethylene glycol, and surfactant and a trace of the chlorine-based organic solvent is introduced from a collected liquid outlet 51 through the second waste liquid supply line 18 into the second vaporization process section 15.

The vaporization gas supply lines 48, 49 are connected to a vaporization gas inlet 52. Connected to the vaporization gas inlet 52 are the second vaporization gas supply line (not shown) that comes from the solvent separation process section 11.

Connected via the second compressed air supply line 35 to the second vaporization gas supply line is the second compressed air supply section 36. An aeration pump for a home aquarium or the like may be used for the second compressed air supply section 36. Compressed air supplied from the second compressed air supply section via the vaporization gas supply lines 48, 49 to the collection tank 47 easily exhaust the tank of the water in the tank 47.

An aeration process section is used for the second vaporization process section 15 similar to the first vaporization process section 12. The aeration process section has a structure such that compressed air supply lines 54, 55 are installed an aeration tank 53.

The dimensions of the aeration tank 53, that is made of a material similar to that of the aeration tank 40, are about 3 to 15 cm in diameter and 3 to 10 cm in height.

A compressed air supply port 56 is installed at the top of the aeration tank 53, and the first compressed air supply section 34 is connected via the first compressed air supply line 33 to the compressed air supply port 56. Connected to a waste liquid inlet (not shown) are the intermediate tube that serves as both the first waste liquid supply line 13 that comes from the aeration tank 40 and the first vaporization gas supply line 14, and the second waste liquid supply line 18 that comes from the collection tank 47. Waste liquid is supplied from the first waste liquid supply line 13 into the aeration tank 53, and vaporization gas generated in the aeration tank 53 is discharged through the first vaporization gas supply line 14 (same as 13).

An aeration pump for a home aquarium or the like may be used for the first compressed air supply section 34. Fresh compressed air that is constantly supplied from the first compressed air supply line 34 via the compressed air supply port 56 into the aeration tank 53 evaporates the chlorine-based organic solvent contained in the waste liquid that is accommodated in the aeration tank 53, with the gas being discharged via the first vaporization gas supply line 14 and through the fist aeration tank 40 and the collection tank 47 to the photo-oxidative decomposition process section 20.

Evaporation gas and compressed air introduced from the second evaporation process section 15 into the first evaporation process section 12 are used in the aeration and evaporation of the chlorine-based organic solvent and substances such as isopropyl alcohol, ethylene glycol, and surfactant in the aeration tank 40.

When the evaporation gas generated by the aeration process in the first evaporation process section 12 passes through the separation member 42, the chlorine-based organic solvent and substances such as isopropyl alcohol, ethylene glycol, and surfactant that have been adsorbed onto the separation member 42 are evaporated so as to supply air containing the chlorine-based organic solvent and substances such as isopropyl alcohol, ethylene glycol, and surfactant to the collection process section 17.

Connected to the bottom of the aeration tank 53 are a treated liquid outlet 57 and the third waste liquid supply line (not shown), so as to send the waste liquid that has been subjected to the aeration process to the treated liquid discharge section 26.

As shown in FIG. 3, the photo-oxidative decomposition process section 20 is provided with a photocatalytic reaction section 60 having a gas supply tube line 58 in which evaporation gas supplied from the third vaporization gas supply line 19 flows, and which is filled with a granular photocatalytic material 59 that decomposes the chlorine-based organic solvent contained in the gas by a photocatalytic reaction, an artificial light irradiation section 62 that has an ultraviolet light source 61 for irradiating the granular photocatalytic material 59 with ultraviolet light, and a reflector plate 63, and the artificial light irradiation section 62 is disposed opposite the photocatalytic reaction section 60 as shown in FIG. 4.

Installed on the upper side of a gas flow line joint fastening section 64 are an aeration gas supply port 65 linked to a first glass tube, and a decomposition product gas discharge port 66 linked to a fourth glass tube.

The gas flow tube line 58 runs vertically, while four straight tube lines 58a are arranged parallel to each other at intervals of 8 to 35 mm in the vertical plane with adjacent straight tube lines 58a being connected in the gas flow line joint fastening section 64, so as to form one long flow tube line.

The straight tube line 58a is made of a material that allows artificial light, such as ultraviolet light, and natural light to be transmitted therethrough, and a transparent material such as borosilicate glass or a synthetic resin can be used.

The inner diameter of the straight tube line 58a is from 5 to 30 mm, and preferably from 8 to 16 mm. When the inner diameter is less than 5 mm, a smaller quantity of the granular photocatalytic material 59 can fill the gas supply tube line 58, resulting in a lower efficiency of the photo-oxidative decomposition, and the smaller inner diameter results in a lower flow rate of gas that leads to a smaller processing capacity. When the inner diameter is larger than 30 mm, it becomes difficult for light emitted by the ultraviolet light source 61 to reach the innermost portion of the straight tube line 58a, resulting in a lower exposure rate of the granular photocatalytic material 59 to light and lower efficiency of the photo-oxidative decomposition.

The length of the straight tube line 58a is preferably made equal to the length of the ultraviolet light source 61, in a range from 200 to 800 mm. This enables it to irradiate the photocatalytic reaction section 60 uniformly over the entire length thereof with ultraviolet light emitted from the ultraviolet light source 61, thereby increasing the efficiency of the photo-oxidative decomposition.

The granular photocatalytic material 59 is made by mixing an inorganic material powder that adsorbs the chlorine-based organic gas and the chlorine-based gas and photocatalytic particles.

The photocatalytic particles are made of a material that is activated by the irradiation of light, for example near ultraviolet rays, and decomposes organic substances that come into contact therewith through the photocatalytic reaction, such as $TiO_2$, CdS, $SrTiO_3$, and $Fe_2O_3$. Among these, $TiO_2$ is most preferably used for its high catalytic performance and low cost.

The inorganic material powder may specifically be calcium silicate, calcium carbonate, sodium carbonate, lime, kaolin clay, wollastonite, talc, nepheline syenite, zeolite, or active carbon, with one or a mixture of two or more thereof being used.

The proportion of the photocatalytic particles in the granular photocatalytic material 59 is set in a range from 10 to 95% by weight, preferably from 30 to 70% by weight, and more preferably from 40 to 60% by weight. When the proportion is less than 10% by weight, the efficiency of the photo-oxidative decomposition becomes insufficient and the chlorine-based organic gas may be released untreated. When the proportion is higher than 95% by weight, the capability of the granular photocatalytic material 59 to adsorb the chlorine-based organic gas becomes insufficient leading to a problem such that, when charged with the chlorine-based organic gas of high concentration in a short period of time, the chlorine-based organic gas is released without being treated.

The granular photocatalytic material 59 is preferably formed in compressed particles. The specific shape of the granular photocatalytic material 59 may be, for example, a ball, barrel, short rod, ellipsoid of revolution, or tablet (substantially cylindrical). The granular photocatalytic material 59 may have holes or surface bumps formed thereon.

The particle size of the granular photocatalytic material 59 is in a range from 1 to 20 mm and preferably from 2 to 10 mm, with the mean diameter being from 4 to 8 mm, and preferably from 5 to 7 mm. When the particle size is less than 1 mm, the granular photocatalytic material is easily loaded resulting in a reduced gas flow rate though the photocatalytic reaction section 60 that leads to a lower efficiency of the photo-oxidative decomposition. When the particle size is larger than 20 mm, the specific surface area (surface area per unit weight) becomes too small, and it becomes difficult for light emitted by the ultraviolet light source 61 to reach the innermost portion of the gas supply tube line 58, resulting in a lower exposure rate of the granular photocatalytic material 59 to light and a lower efficiency of the photo-oxidative decomposition.

The joint member that links the straight tube lines 58a is constituted mainly from a main body (not shown) that links the ends of straight tube lines 58a together, a cover (not shown) that can be attached to the main body, and an O-ring that is a ring-shaped sealing member.

The main body has a rectangular parallelepiped shape that has holes into which the ends of the straight tube lines 58a are inserted, so that gas flows from one straight tube line 58a inserted into a hole through a flow passage formed in the main body to another straight tube line 58a.

The inner surface of the flow passage is coated with a polymeric substance such as a fluorine resin or polyethylene resin that has high corrosion resistance and high chemical resistance or, alternatively, the main body itself may be made of a metal such as a Hastelloy alloy that has high corrosion resistance and high chemical resistance, or a polymeric substance such as a fluorine resin, polyethylene resin, or PPS.

The opening in the main body is tapered with the inner diameter increasing toward the end so that the O-ring (not shown) is interposed between the tapered portion and the straight tube line 58a.

The cover has holes for inserting the straight tube lines 58a, 58a, and is fastened onto the main body in contact with the opening end of the main body.

The O-ring is disposed in a gap between the tapered portion and the straight tube line 58a in contact with the main body, the cover, and the outer surface of the straight tube line 58a. The O-ring is preferably compressed by the main body and the cover so as to be deformed elastically, and is made of an elastic material such as rubber.

The main body is made with the opening which is located at the upper end of the tube line 58a and the opening of the insertion hole having diameters that are larger than the outer diameter of the straight tube line 58a, so that the straight tube line 58a can move in the longitudinal direction.

In order to allow the straight tube line 58a to be replaced easily without removing the cover, a configuration is employed such that moving the straight tube line 58a toward the upper end causes the lower end to move away from the top surface of the cover and the straight tube line 58a can be tilted. Thus, assuming that the lower end of the straight tube line 58a is inserted into the cover and the main body to a depth of A and that the distance between the upper end of the straight tube line 58a and the innermost portion of the flow passage in the main body is B, then a relation B>A is established.

In order to make the depths to which the straight tube line 58a is inserted equal at the upper end and at the lower end, the hole for inserting the straight tube line 58a in the main body at the lower end has a step where the diameter is smaller than the outer diameter of the straight tube line 58a, thereby preventing the straight tube line 58a from being inserted beyond the depth A.

The artificial light irradiation sections 62 are installed on the front and back sides of the photocatalytic reaction section 60, and are provided with two ultraviolet light sources 61 having a straight tube shape opposite the photocatalytic reaction section 60, and holders 67 of a rectangular plate shape that secure the ultraviolet light sources.

The ultraviolet light sources 61 are disposed in the vertical direction so as to uniformly irradiate the entire photocatalytic reaction section 60 with ultraviolet rays.

For the ultraviolet light source 61, a general purpose excimer lamp, black light, or the like is used.

The reflector plate 63 is installed to surround the photocatalytic reaction section 60 and the artificial light irradiation section 62. The reflector plate 63 is constituted so as to reflect the light emitted by the ultraviolet light sources 61 at a high efficiency and illuminate the granular photocatalytic material 59 and so that light does not escape to the outside when the ultraviolet light sources 61 are turned on. The reflector plate 63 is preferably arranged to have a hexagonal cross section when projected onto a horizontal plane as shown in FIG. 4.

The reflector plate 63 is made of a material such as aluminum, stainless steel, or copper that has a high heat dissipating characteristic and a smooth surface.

A decomposition product gas generated in the photo-oxidative decomposition process section 20 is introduced into the post-treatment process section 22 via the decomposition product gas discharge port 66 and the decomposition product gas supply line 21.

The post-treatment process section 22 has a structure such that a processing agent supply port 69, a decomposition product gas inlet 70, and a treated gas discharge port 71 are installed in a post-treatment tank 68.

The processing agent supply port 69 is connected to a processing agent supply section 30 via a processing agent supply line 29. The decomposition product gas inlet 70 is connected to the decomposition product gas supply line 21. Also connected to the decomposition product gas inlet 70 are decomposition product gas supply lines 72, 73 that are installed in the post-treatment tank 68. The discharge line 25 is connected to the treated gas discharge port 71.

The post-treatment tank 68 is a container having a capacity of about 10 to 30 liters, is made of a material such as a fluorine resin, polyethylene resin, or the like that has high corrosion resistance, or is a tank lined with such a material on its inner surface.

The post-treatment tank 68 is filled with a processing agent for adsorbing, absorbing, and neutralizing the decomposition product gas supplied from the decomposition product gas inlet 70.

The processing agent may be, for example, alkali ionic water containing one or more materials selected from calcium sulfite, calcium silicate, sodium carbonate, sodium bicarbonate, sodium thiosulfate, calcium carbonate, lime, ammonia, sodium hydroxide, alkali ionic water, and water.

The form of the processing agent is not limited to the liquid phase, and may be a powdery fluidized bed or a compound form thereof.

The decomposition product gas supply line 21, the treated gas discharge line 25, the decomposition product gas inlet 70, the treated gas discharge port 71, the treated solution discharge port 79, and the decomposition product gas supply lines 72, 73 are preferably made of a polymeric substance that has high corrosion resistance and high chemical resistance such as a fluorine resin, polyester resin, or nylon resin.

The liquid level in the post-treatment tank 68 can be monitored by means of a liquid level sensor 76 installed on the outer surface in a middle portion of the post-treatment tank 68, so as to maintain the liquid level in the post-treatment tank 68 to be constant.

The processing agent is supplied from a processing agent supply section via a processing agent supply line into the post-treatment tank 68.

After adsorbing, absorbing, and neutralizing a predetermined quantity of decomposition product gas, or after a predetermined period of time has elapsed, the processing agent is discharged via the treated solution discharge port 79 and the discharge line into the treated liquid discharge section, and then a predetermined quantity of the processing agent is supplied to the post-treatment tank 68.

The treated liquid discharge section 26, comprises a treated liquid aeration tank 88, a gas exhaust port 89, and a liquid discharge port 81, a treated gas inlet 80, and treated gas exhaust lines 82, 83. When a solenoid valve installed in the third waste liquid supply line 24 connected to the second vaporization process section 15 or a solenoid valve installed in the discharge line 28 is opened, the treated liquid flows down into the treated liquid reservoir by gravity. The liquid level in the treated liquid aeration tank 88 can be monitored by means of a liquid level sensor 86 installed on the outer surface in a middle portion of the treated liquid aeration tank 88, so as to maintain the liquid level in the treated liquid aeration tank 88 to be constant.

The treated liquid reservoir is always kept full of liquid, while overflowing waste liquid is spontaneously discharged, and the concentration of the treated liquid can be constantly monitored.

Installed adjacent to the photocatalytic reaction section 60 is a control section 77 that controls the various sections of the waste liquid processing apparatus, and is enclosed by a cover 78 to shield it from the heat of the ultraviolet light source 61.

The control section 77 is constituted mainly from an ground fault breaker, a sequencer, a pump power outlet, and an inverter circuit for the ultraviolet light source. The control section 77 has the function of controlling the entire waste liquid processing apparatus including the solvent separation process section 11, the first vaporization process section 12, the second vaporization process section 15, the collection process section 17, the photo-oxidative decomposition process section 20, the post-treatment process section 22, the treated liquid discharge section 26, and the processing agent supply section 30, and is capable of automatic operation.

In the waste liquid processing apparatus having a constitution such as described above, the chlorine-based organic solvent that is dispersed in the form of minute particles in the raw waste liquid is separated in the solvent separation process section 11, the chlorine-based organic solvent remaining in the waste liquid is vaporized in the first vaporization process section 12 and the second vaporization process section 15, the vaporized gas of the chlorine-based organic solvent is decomposed by a photo-oxidation reaction in the photo-oxidative decomposition process section 20, and the decomposition product gas containing the chlorine-based gas generated thereby is converted into non-toxic chlorides in the post-treatment process section 22. Thus, the amounts of the treated liquid to be discharged, the chlorine-based organic substances contained in the exhaust gas, and the chlorine-based gas to be discharged as a secondary product can be constrained within the effluent standards specified by the Water Pollution Control Law. The present invention is capable of making contributions to the control of environmental pollution, since the concentration of the chlorine-based organic solvent contained in the effluent eventually approaches 0 ppm and an effluent which has been rendered non-toxic is released to the outside.

The present invention has a constitution such that the chlorine-based organic solvent contained in waste liquid discharged from a dry cleaning apparatus or the like is adsorbed in the solvent separation process section 11 and is vaporized in the first vaporization process section 12 and the second vaporization process section 15, before being decomposed by a photo-oxidation reaction in the photo-oxidative decomposition process section 20. Therefore, the present invention has a higher efficiency of the photo-oxidative decomposition than in the case of carrying out a photo-oxidative decomposition directly on the waste liquid, thus reducing the time and cost required for processing.

In the collection process section 17, substances such as isopropyl alcohol, ethylene glycol, and surfactant can be removed almost completely from the waste liquid. Therefore, there is no possibility of these substances being introduced into the photo-oxidative decomposition process section 20, and the capability of the photo-oxidative decomposition process section 20 to decompose the chlorine-based organic gas by a photo-oxidation reaction does not deteriorate.

Further, in the waste liquid processing apparatus of this example, since the vaporization process in the first vaporization process section 12 is carried out using the mixture of air used in the vaporization process in the second vaporization process section 15 and the chlorine-based organic gas generated by vaporization in the second vaporization process section 15, a high efficiency of vaporization is ensured and the apparatus can be simplified.

Since the vaporization of the chlorine-based organic solvent is carried out in two stages, the chlorine-based organic solvent contained in the waste liquid can be vaporized substantially completely into the chlorine-based organic gas that is introduced into the photo-oxidative decomposition process section 20. As a result, the waste liquid can be rendered substantially completely non-toxic and can be discharged to the outside.

Moreover, the chlorine-based organic solvent adsorbed onto the separation member 42 is vaporized by the vaporization gas generated by the aeration process, and the vaporization gas can be discharged into the second vaporization gas supply line 16 by the pressure in the aeration tank 40, thus efficiently utilizing energy. Through these operations, the separation member 42 can be regenerated without being saturated with the chlorine-based organic solvent, and can be repetitively used in the separation of the solvent.

According to the present invention, as described above, since substances such as isopropyl alcohol, ethylene glycol, and surfactant can be collected substantially completely, and removed from the waste liquid, the capability of the photo-oxidative decomposition process section 20 to decompose the chlorine-based organic gas by a photo-oxidation reaction does not deteriorate. Also, because the vaporization of the chlorine-based organic solvent is carried out in two stages, the chlorine-based organic solvent contained in the waste liquid can be vaporized substantially completely into the chlorine-based organic gas that is introduced into the photo-oxidative decomposition process section. As a result, the concentration of the chlorine-based organic substances contained in the effluent and the exhaust gas and the chlorine-based gas to be discharged as a secondary product can be constrained to within the effluent standards. Moreover, since the vaporization process in the first vaporization process section is carried out using the mixture of air used in the vaporization process in the second vaporization process section and the chlorine-based organic gas generated by vaporization in the second vaporization process section, a high efficiency of vaporization is ensured and the apparatus can be simplified.

Also, according to the waste liquid processing apparatus of the present invention, since the vaporization process in the first vaporization process section is carried out using the mixture of air used in the vaporization process in the second vaporization process section and the chlorine-based organic gas generated by vaporization in the second vaporization process section, a high efficiency of vaporization is ensured and the apparatus can be simplified.

What is claimed is:

1. A waste liquid processing apparatus comprising:
   a separator where a chlorine-based organic solvent contained in a waste liquid is separated;
   a first vaporizer, which is connected to the separator, having functions that include vaporization of the chlorine-based organic solvent remaining in the waste liquid after a solvent separation process performed by the separator;
   a collector, which is connected to the separator via a second vaporization gas supply line, having water for trapping, in the water, water-soluble substances contained in the waste liquid after being vaporized in a first vaporization process by the first vaporizer,
   a second vaporizer, which is connected to the first vaporizer via a first waste liquid supply line and a first vaporization gas supply line, for vaporizing the chlorine-based organic solvent remaining in the waste liquid after the first vaporization process and a collection process by the collector;
   a photo-oxidative decomposer, which is connected to the collector via a third vaporization gas supply line, where photo-oxidation is used to decompose;
   a chlorine-based organic gas generated in the first vaporization process and subjected to the collection process; and
   a chlorine-based organic gas generated in a second vaporization process by the second vaporizer;
   a post-treatment processor, which is connected to the photo-oxidative decomposer via a decomposition product gas supply line, for carrying out adsorption, absorption, and neutralization of a decomposition product gas generated in a photo-oxidative decomposition process by the photo-oxidative decomposer; and
   a control section that has a sequencer for controlling the waste liquid processing apparatus.

2. The waste liquid processing apparatus according to claim 1, wherein said post-treatment processor contains a processing agent and is connected to a processing agent supply section that controls a concentration of the processing agent so as to be constant.

3. The waste liquid processing apparatus according to claim 1, wherein said second vaporizer and said post-treatment processor are connected to a treated liquid discharge section.

4. A waste liquid processing apparatus comprising:
   solvent separation means for separating a chlorine-based organic solvent contained in a waste liquid;
   first vaporization means for performing a first vaporization process, vaporizing the chlorine-based organic solvent remaining in the waste liquid after the solvent separation process by the solvent separation means;
   collection process means for performing a collection process, trapping, in water, water-soluble substances contained in the waste liquid after being vaporized in the first vaporization means;
   second vaporization means for performing a second vaporization process vaporizing the chlorine-based organic solvent remaining in the waste liquid after the first vaporization process and the collection process;
   photo-oxidative decomposition means for performing a photo-oxidative decomposition process to decompose:
   a chlorine-based organic gas generated in the first vaporization process, subjected to the collection process; and a chlorine-based organic gas generated in the second vaporization process;

post-treatment means for carrying out adsorption, absorption, and neutralization of a decomposition product gas generated in the photo-oxidative decomposition process; and control means for controlling these means.

5. The waste liquid processing apparatus according to claim 4, further comprises:

a processing agent supply section, that controls a concentration of the processing agent so as to be constant.

6. The waste liquid processing apparatus according to claim 4, wherein said second vaporization means and said post-treatment means are connected to a treated liquid discharge section.

* * * * *